March 16, 1926.
F. CHENEY
1,576,720
CONSTANT SPEED ELECTRIC DRIVE FOR TALKING MACHINES
Filed August 13, 1921  3 Sheets-Sheet 1
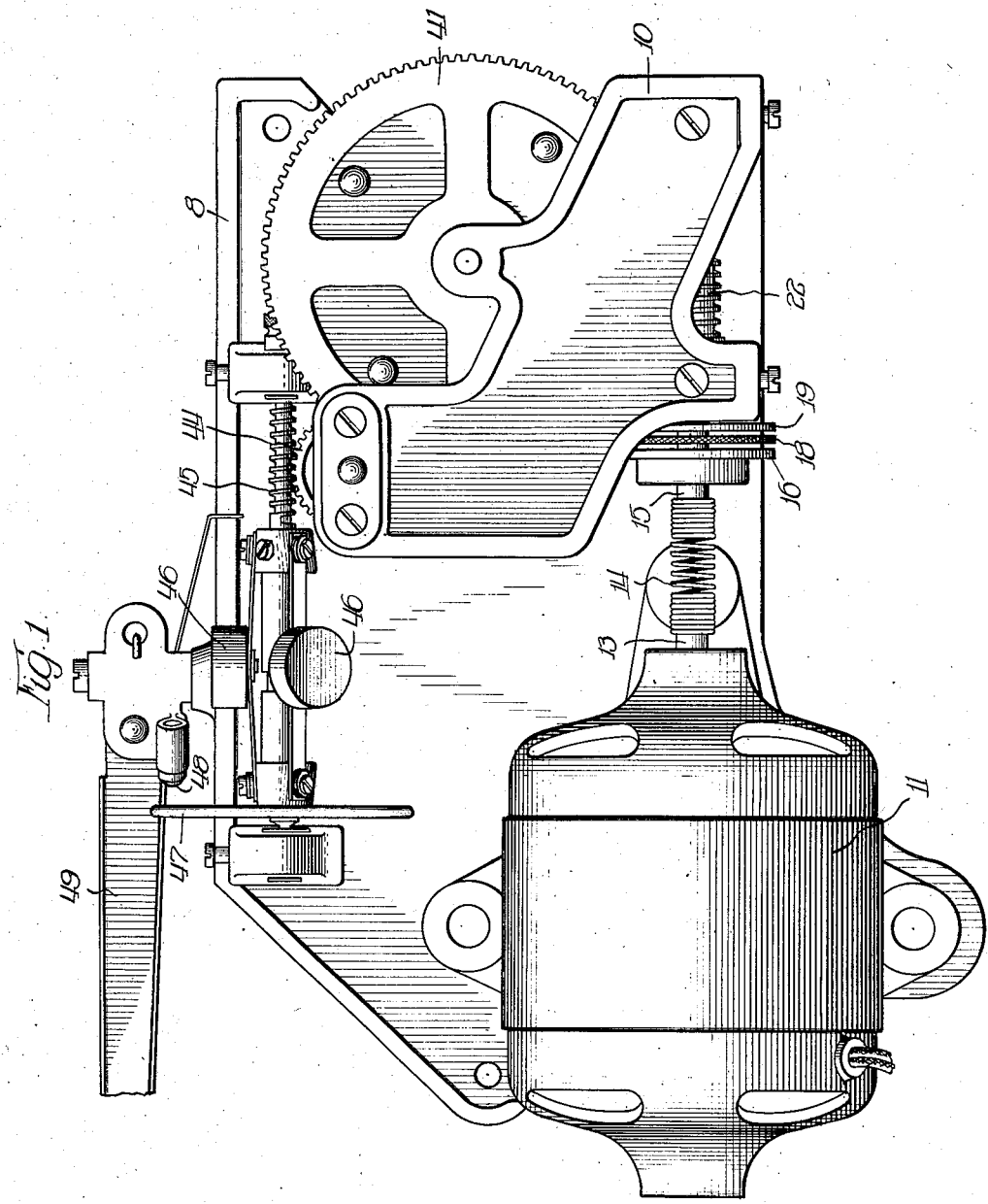
Witness
R. Burkhardt
Inventor:
Forest Cheney,
By Wilkinson Huxley Byron & Knight
Attys

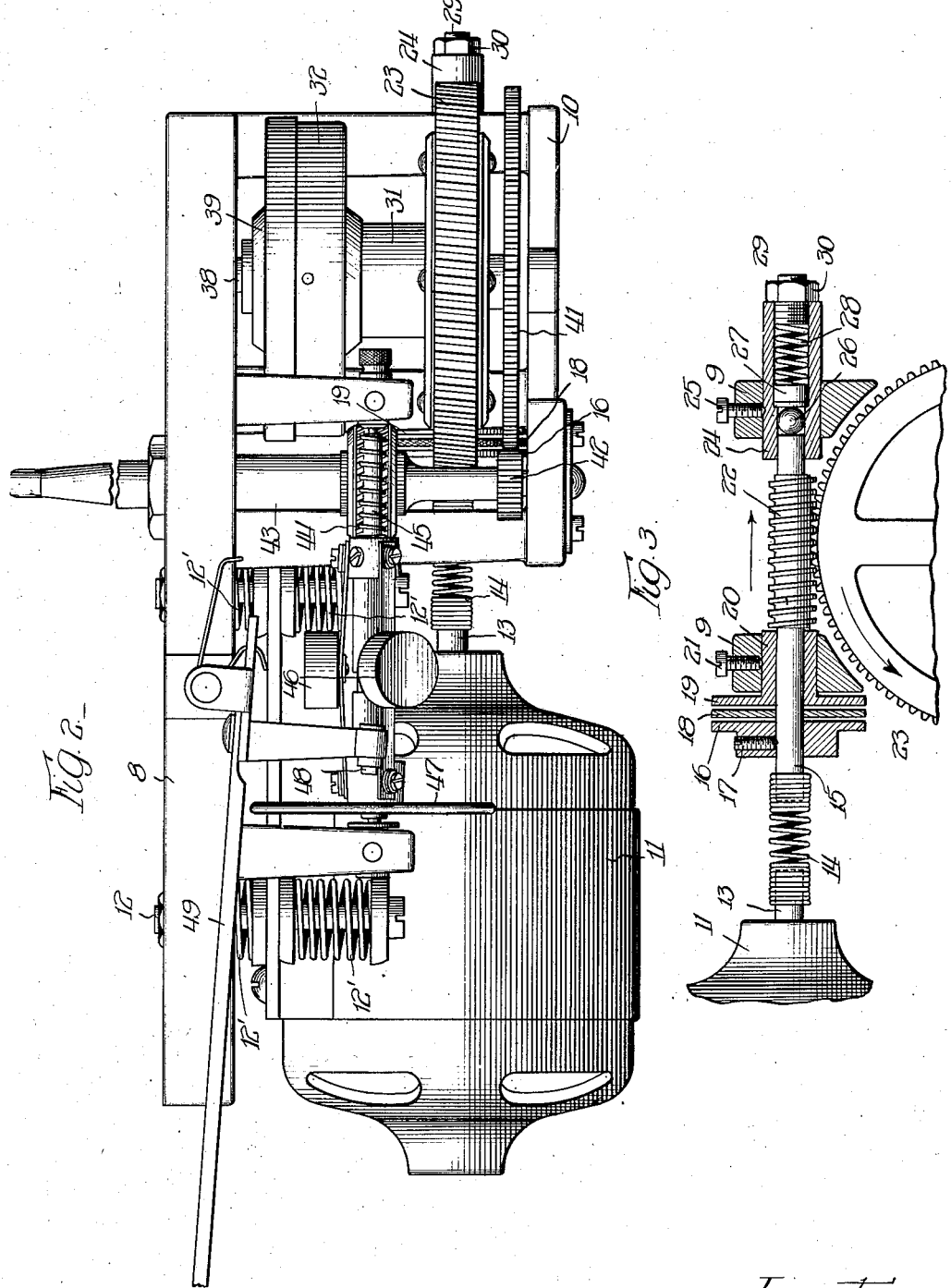

March 16, 1926. 1,576,720
F. CHENEY
CONSTANT SPEED ELECTRIC DRIVE FOR TALKING MACHINES
Filed August 13, 1921     3 Sheets-Sheet 3
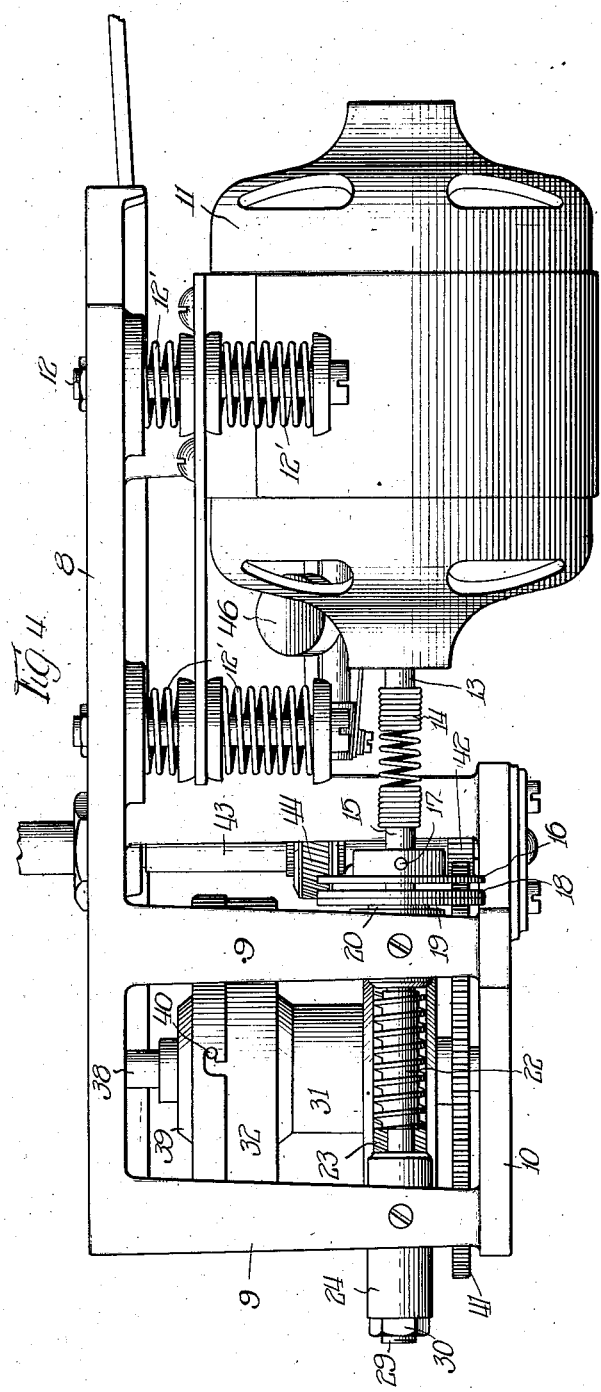
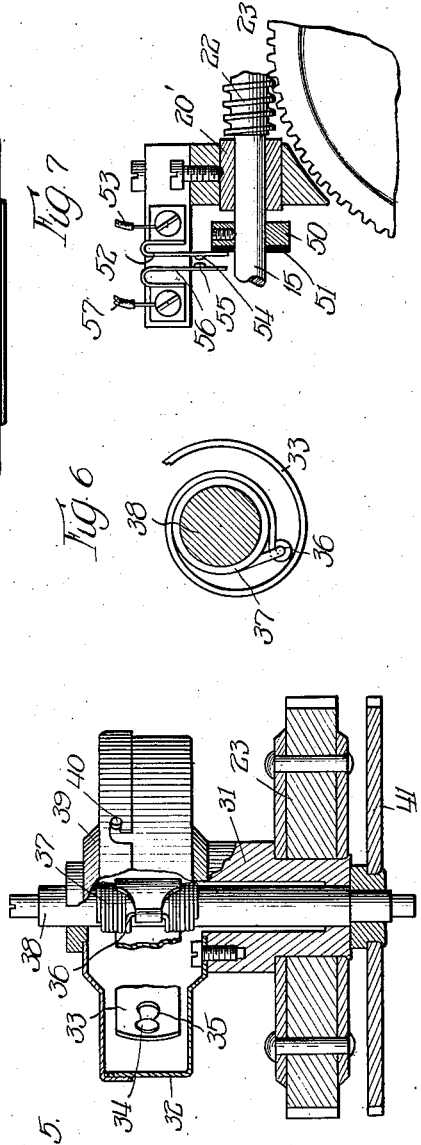
Witness:
R. Burkhardt.
Inventor
Forest Cheney,
By Wilkinson, Hurley, Byron & Knight
Attys Patented Mar. 16, 1926.

1,576,720

UNITED STATES PATENT OFFICE.

FOREST CHENEY, OF GRAND RAPIDS, MICHIGAN, ASSIGNOR TO CHENEY TALKING MACHINE CO., OF CHICAGO, ILLINOIS, A CORPORATION OF ILLINOIS.

CONSTANT-SPEED ELECTRIC DRIVE FOR TALKING MACHINES.

Application filed August 13, 1921. Serial No. 492,209.

*To all whom it may concern:*

Be it known that I, FOREST CHENEY, a citizen of the United States, residing at Grand Rapids, in the county of Kent and State of Michigan, have invented certain new and useful Improvements in Constant-Speed Electric Drives for Talking Machines, of which the following is a specification.

This invention relates to a new and improved electric motor drive for talking machines, and more particularly to new and improved means for controlling the speed of such motors, and for transmitting the power from such motors to the turntable spindle of the talking machine.

Heretofore, many devices have been evolved in the attempt to provide an electric drive for talking machines, but such devices have encountered the difficulties incident to the fact that electric motors are subject to fluctuation in speed, whereas it is absolutely essential for proper sound reproduction that the turntable speed be uniform. In all commercial lighting currents there is a slight voltage fluctuation which renders absolute uniformity of motor operation impossible. It has, therefore, heretofore generally been customary to use the electric motor simply to intermittently rewind a spring motor of usual type.

A further difficulty is caused by the fact that a motor must be provided powerful enough to drive the turntable when the voltage is at its lowest point of fluctuation. A motor of this size will thus be too powerful when the voltage is normal.

It is an object of the present invention to provide driving means interposed between an electric motor and a talking machine turntable or other mechanism requiring absolute uniformity of drive, the interposed driving means being adapted to take up any fluctuations in motor speed.

It is an additional object to provide means adapted to automatically retard the motor speed or stop the motor when the interposed driving means reaches a predetermined condition.

It is also an object to provide a new and improved spring connection for the springs of devices of this character.

It is a further object to provide a device which is relatively simple and inexpensive in manufacture and which is positive in its operation. Other and further objects will appear as the description proceeds.

Broadly, my invention includes the interposition of a partly wound spring or its equivalent between the electric motor and the turntable spindle. This interposed spring takes care of a limited amount of over running of the motor and further serves as a reserve means for driving the turntable during periods of underrunning of the motor.

My invention further includes the interposition of brake means between the motor and the spring adapted automatically to stop the motor or to retard the motor speed when the spring is wound more than a predetermined amount. The usual speed governing means may be connected with the turntable spindle in the customary manner.

I have illustrated certain preferred embodiments of my invention in the accompanying drawings, in which Figure 1 is a view of the driving assembly as seen from below, Figure 2 is a view as seen from the upper side of Figure 1, Figure 3 is a fragmentary view, partly in section, showing the motor brake, Figure 4 is a view as seen from the lower side of Figure 1, Figure 5 is a fragmentary detail partly in section, showing the spring assembly, Figure 6 is a fragmentary detail showing the spring connection, and Figure 7 is a fragmentary detail showing an alternative construction of the motor control means.

The motor supporting plate 8 is provided with the depending legs 9, to the lower end of which are secured the bottom plate 10. The electric motor 11 is supported below the plate 8 by means of bolts 12 and cushion springs 12' which serve to prevent the transmission of motor vibration to the supporting plate.

The motor shaft 13 is connected by the flexible connection 14 to the driven shaft 15. This flexible connection 14 comprises an open wound spring, the ends of which closely grip the respective shafts.

As best shown in Figure 3, the driven shaft 15 has the friction disc 16 secured thereto by the set screw 17. Adjacent this disc 16 is the loose brake disc 18 and the fixed friction disc 19. The disc 19 is integral with the bearing 20, which is secured in an arm 9 by means of set screws 21. Beyond the bearing 20 the shaft 15 is provided with the worm gear 22, which engages the gear wheel 23. The end of the shaft 15 fits into the tubular bearing 24, the latter being held in place in an arm 9 by set screw 25. The ball 26 fits in the bearing 24 and serves to take the end thrust of the shaft 15. This ball is supported against this thrust by the cap 27 which is urged inwardly by the spring 28. The effective strength of the spring 28 may be varied by adjusting the screw 29 and the adjustment may be maintained by means of the lock nut 30.

Referring now particularly to Figure 5; the gear wheel 23 is secured to the hub 31 and the latter has secured thereto the drum 32. The outer end of the spring 33 is secured to the drum 32 by means of the stud 34 and bayonet slot 35. The inner end of the spring is secured to the central portion 36 of the spring connector 37. This connection is shown in cross section in Figure 6. The ends of the spring 37 are wound a plurality of turns about the shaft 38. The drum 32 is closed by the cover 39 held in place by the stud 40.

To the lower end of the shaft 38 is secured the gear wheel 41. As best shown in Figure 2, this gear wheel 41 is in mesh with the pinion 42, carried by the turnable spindle 43. The spindle 43 also carries the gear 44 in mesh with a worm gear 45 which later drives a usual type of centrifugal governor 46. This governor carries the friction disc 47 which is adapted to be engaged by the adjustable friction member 48, the latter being operated by the arm 49 as is customary in the art.

In the alternative form shown in Figure 7, the shaft 15 is supporting a bearing 20' and carries an operating disc 50 which has a nonconducting face 51 adapted to engage a spring finger 52. This finger 52 has connected thereto the electric lead wire 53 and carries the contact 54. This contact 54 is adapted to engage a similar contact 55 carried by a similar spring finger 56. This finger 56 is connected to the lead wire 57. The lead wires are part of the motor circuit.

In the operation of my device, electric power is supplied to the motor 12 which causes the shaft 13 to rotate. This rotation is transmitted by the flexible connection 14 to the shaft 15. This connection 14 not only permits relative movement of the shafts 13 and 15 out of line, but also permits relative longitudinal movement of the shafts. Rotation of the shaft 15 serves by means of the worm gear 22, to rotate the gear wheel 23 in the counter clockwise direction. This rotation of the gear wheel winds up the spring 33 in the drum 32. During this winding, the spring 37 grips the shaft 38 and power is transmitted through the spring to this shaft 38 and the latter is thereby rotated.

The shaft 38 carries with it in its rotation, the gear wheel 41 which is in mesh with the pinion 42 upon the turntable spindle. The turntable is thus rotated by the electric motor, the power being transmitted through the spring 33. The speed of rotation of the turntable spindle is regulated by the governor 46 in the manner well known to the art.

When the motor 13 rotates at a greater speed than that required by the rotation of the turntable, the spring 33 will become more and more wound up. The resistance of this partly wound spring will be transmitted through the gear wheel 23 and the worm gear 22 to the shaft 15. It will tend to thrust that shaft to the right as seen in Figure 3. This movement of the shaft to the right will be resisted by the flexible connection 14 to some extent and will also be resisted by the thrust of the spring 28. However, the spring 28 in practice will preferably be so adjusted that when the spring 33 is approximately three quarters wound, the shaft 15 will move to the right, and will be carried to the right until the disc 16 forces the friction disc 18 against the fixed disc 19.

The friction between these several discs will serve to retard the speed of the motor by increasing its load. During this retardation, the stored power in the spring 33 will continue to rotate the turntable at the desired speed. In so doing, the tension of the spring is reduced and its thrust upon the shaft 15 is correspondingly lessened. The shaft is then carried to the left by the springs 14 and 28 and the frictional effect of the discs 16, 18 and 19 is relieved. The motor again operates to wind up the spring, and maintain it partly wound.

Obviously, the motor at a strictly uniform speed would maintain the spring 33 a uniform amount wound up. Due to fluctuation in speed of the motor caused by variations in voltage this uniformity is not secured in practice. The stored power in the spring 33 will take care of short periods of underrunning of the motor and the frictional brake disc will automatically overload the motor when it tends to overrun more than an amount sufficient to partly wind the spring 33.

The alternative form of Figure 7 shows a make and break switch operated by the longitudinal movement of the shaft 15. When the shaft 15 is carried to the right by the pressure exerted by the spring 33 upon its becoming wound to the predetermined point, the disc 50 and its face 51 move to the right and permit the spring fingers 52 and 56 to separate, thus breaking contact between the points 54 and 55. The electric motor is thus stopped by this breaking of its circuit. When the spring 33 becomes run down to a predetermined tension controlled by the spring 28 and end thrust 29, the shaft 15 again moves to the left forcing the fingers 52 and 56 together and making contact between points 54 and 55, thus closing the motor circuit and the electric motor again takes up its work.

The spring connection shown in Figures 5 and 6, for the inner end of spring 33, is a very desirable feature for preventing the possibility of breaking the spring when it is run down and the momentum of the turntable carries the spring beyond the run down position. In this case the backward thrust from the spring serves to slightly loosen the spring coils 37 of the connecting spring, and these coils release their grip on the shaft 38.

The inner end of the spring 33 is thus not held positively against an unwinding thrust. On the other hand, when the spring 33 is wound, the pull transmitted from the spring 33 to the center portion 36 of the spring 37, draws that spring into clamping engagement with the shaft 38, and the power is thus fully transmitted to the shaft 38.

It is my intention to cover all modifications of my device coming within the spirit and scope of the following claims.

1. In a driving mechanism, a driven spindle, a driving electric motor, a driving spring interposed between the motor and spindle, said spring being adapted to store energy to compensate for fluctuation in motor speed, and means adapted to be automatically applied to retard the motor speed when the stored energy reaches a predetermined point.

2. In a driving mechanism, a driven spindle, a driving electric motor, a driving spring interposed between the motor and spindle, said spring being adapted to store energy to compensate for fluctuation in motor speed, and means operable by the spring adapted to be automatically applied to retard the motor speed when the stored energy reaches a predetermined point.

3. In a driving mechanism, a driven spindle, a driving electric motor, a driving spring interposed between the motor and spindle, said spring being adapted to store energy to compensate for fluctuation in motor speed, and a friction brake operating upon the motor shaft and adapted to be thrown in operation by the spring when the stored energy reaches a predetermined point.

4. In a driving mechanism, a driven spindle, a driving electric motor, a driving shaft connected to the motor by a connection permitting movement of the shaft relative to the motor, driving means connecting the shaft and spindle and a friction brake acting to retard the motor and actuated by movement of the shaft relative to the motor.

5. In a driving mechanism, a driven spindle, a driving electric motor, a driving shaft connected to the motor by a flexible connection permitting longitudinal movement of the shaft relative to the motor, driving means connecting the shaft and spindle, a fixed friction member adjacent the shaft and a friction member carried by the shaft and adapted to be carried by movement of the shaft into engagement with the fixed member to thereby retard the motor.

6. In a driving mechanism, a driven spindle, a driving electric motor, a driving shaft connected to the motor by a flexible connection permitting longitudinal movement of the shaft relative to the motor, driving means connecting the shaft and spindle, said means including a spring adapted to store energy and when said energy reaches a predetermined point to impart longitudinal movement to the shaft, a fixed friction member adjacent the shaft and a friction member carried by the shaft and adapted to be carried by movement of the shaft into engagement with the fixed member to thereby retard the motor.

7. In a driving mechanism, a driven spindle, a driving electric motor, a driving shaft connected to the motor by a connection permitting longitudinal movement of the shaft relative to the motor, adjustable means adapted to resist longitudinal movement of the shaft, a driving means connecting the shaft and spindle, a fixed friction member adjacent the shaft, and a friction member carried by the shaft and adapted to be carried by movement of the shaft into engagement with the fixed member to thereby retard the motor.

Signed at Grand Rapids, Michigan, this eighth day of August, 1921.

FOREST CHENEY.